(12) United States Patent
Boroughs et al.

(10) Patent No.: US 11,260,640 B2
(45) Date of Patent: Mar. 1, 2022

(54) TAPE LAMINATION MACHINE SCRAP COLLECTION ASSEMBLY

(71) Applicant: Fives Machining Systems, Inc., Fond du Lac, WI (US)

(72) Inventors: Nicholas Boroughs, Seattle, WA (US); Duncan Kochhar-Lindgren, Seattle, WA (US); Cody Casteneda, Kent, WA (US); Nicholas Gacek, Seatec, WA (US); Amanda Kotchon, Seattle, WA (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 0 days.

(21) Appl. No.: 17/027,962

(22) Filed: Sep. 22, 2020

(65) Prior Publication Data

US 2021/0245486 A1    Aug. 12, 2021

Related U.S. Application Data

(60) Provisional application No. 62/971,032, filed on Feb. 6, 2020.

(51) Int. Cl.
  *B32B 37/00*     (2006.01)
  *B32B 38/00*     (2006.01)
  (Continued)

(52) U.S. Cl.
  CPC ...... *B32B 37/0053* (2013.01); *B32B 38/0004* (2013.01); *B29C 70/386* (2013.01);
  (Continued)

(58) Field of Classification Search
  None
  See application file for complete search history.

(56) References Cited

U.S. PATENT DOCUMENTS

| 5,110,395 A | 5/1992 | Vaniglia |
| 5,273,614 A | 12/1993 | Grimshaw et al. |

(Continued)

FOREIGN PATENT DOCUMENTS

| CN | 202242224 U | 5/2012 |
| CN | 103737945 A | 4/2014 |

(Continued)

OTHER PUBLICATIONS

International Search Report for International Application No. PCT/US2020/037223 dated Sep. 28, 2020 (3 pages).

(Continued)

*Primary Examiner* — Linda L Gray
(74) *Attorney, Agent, or Firm* — Reising Ethington P.C.

(57) ABSTRACT

A scrap collection assembly for a tape lamination head that applies a plurality of composite tape segments includes a crack-off assembly with a scrap crack-off redirect roller configured to engage one or more composite tape segments and one or more scrap portions; a secondary crack-off roller configured to engage one or more composite tape segments and one or more scrap portions; a pivot that connects the crack-off assembly to the tape lamination head, wherein the secondary crack-off roller selectively moves about the pivot to change a direction of composite tape movement; and a conveyor that receives the scrap portion(s) from the secondary crack-off roller.

6 Claims, 6 Drawing Sheets

(51) Int. Cl.
    *B29C 70/00*     (2006.01)
    *B29C 70/38*     (2006.01)
    *B32B 38/04*     (2006.01)
    *B32B 38/18*     (2006.01)
    *B29C 70/54*     (2006.01)

(52) U.S. Cl.
CPC .......... *B29C 70/388* (2013.01); *B29C 70/545* (2013.01); *B32B 38/1808* (2013.01); *B32B 2038/045* (2013.01); *Y10T 156/1174* (2015.01); *Y10T 156/1195* (2015.01); *Y10T 156/13* (2015.01); *Y10T 156/1348* (2015.01); *Y10T 156/1778* (2015.01); *Y10T 156/195* (2015.01); *Y10T 156/1956* (2015.01); *Y10T 156/1994* (2015.01)

(56) References Cited

U.S. PATENT DOCUMENTS

| | | |
|---|---|---|
| 5,290,389 A | 3/1994 | Shupe et al. |
| 5,698,066 A | 12/1997 | Johnson et al. |
| 5,979,531 A | 11/1999 | Barr et al. |
| 6,846,378 B2 * | 1/2005 | Kuhn ................. B65H 35/0013 156/248 |
| 7,975,746 B2 | 7/2011 | Neeper et al. |
| 8,424,583 B2 * | 4/2013 | McCowin ............ B29C 70/386 156/759 |
| 8,438,825 B2 | 5/2013 | Beraud et al. |
| 8,954,180 B2 | 2/2015 | Oldani |
| 9,149,949 B2 | 10/2015 | Johnson et al. |
| 9,314,974 B2 | 4/2016 | Buttrick et al. |
| 9,315,007 B2 | 4/2016 | Vaniglia |
| 9,694,546 B2 | 7/2017 | Kisch |
| 9,782,937 B1 | 10/2017 | Modin et al. |
| 10,112,348 B2 | 10/2018 | Oldani |
| 2010/0276087 A1 | 11/2010 | Weinman et al. |
| 2011/0030903 A1 | 2/2011 | Anderson et al. |
| 2012/0018099 A1 | 1/2012 | Mc Cowin |
| 2012/0325403 A1 | 12/2012 | Chereau et al. |
| 2013/0111725 A1 | 5/2013 | Torres Martinez |
| 2014/0238612 A1 | 8/2014 | Vaniglia et al. |
| 2018/0361688 A1 | 12/2018 | Kaiser et al. |
| 2019/0061288 A1 | 2/2019 | Wulfsberg et al. |
| 2019/0077094 A1 | 3/2019 | Hamlyn et al. |
| 2020/0346800 A1 * | 11/2020 | Kobayashi .............. B65B 15/04 |

FOREIGN PATENT DOCUMENTS

| | | |
|---|---|---|
| EP | 2495093 B1 | 4/2015 |
| JP | 2018076124 A | 5/2018 |

OTHER PUBLICATIONS

Written Opinion for International Application No. PCT/US2020/037223 dated Sep. 28, 2020 (4 pages).

International Search Report for International Application No. PCT/US2020/052106 dated Jan. 8, 2021 (4 pages).

Written Opinion for International Application No. PCT/US2020/052106 dated Jan. 8, 2021 (6 pages).

* cited by examiner

TAPE LAMINATION MACHINE SCRAP COLLECTION ASSEMBLY

CROSS-REFERENCE TO RELATED PATENT APPLICATION

This is a U.S. Non-provisional patent application claiming the benefit of priority from U.S. Provisional patent application No. 62/971,032 filed on Feb. 6, 2020, the entire contents of which are incorporated herein.

TECHNICAL FIELD

The present application relates to tape lamination machines and, more particularly, to a scrap collection assembly included with a tape lamination head.

BACKGROUND

Tape lamination machines are used to create composite workpieces. Composite material, in the form of fibrous material impregnated with resin, is applied by the machines at precise locations and lengths to collectively form a composite workpiece. The tape lamination machine moves a tape lamination head to precisely apply composite tape in the ultimate shape of the composite workpiece. As the tape lamination head moves, it leaves a plurality of composite tape segments, also referred to as a course behind. The automatic application of these composite tape segments involves the cooperation of a diverse collection of machinery that holds, moves, and ultimately cuts the composite tape.

Each composite tape segment can include a head portion and a tail portion at ends of the segment. The head portion and the tail portion are shaped by a cutting blade that cuts the composite tape thereby forming the tail portion of one composite tape segment and the head portion of a subsequent composite tape segment. Some composite tape segments have relatively simple shapes, such as a butt cut, that simultaneously separates the tail portion of one composite tape segment from the head portion of another composite tape portion. However, other composite tape segments may be created from cuts in the supplied composite tape that leaves unwanted scrap material on backing paper that will be disposed.

SUMMARY

In one implementation, a scrap collection assembly for a tape lamination head that applies a plurality of composite tape segments includes a crack-off assembly with a scrap crack-off redirect roller configured to engage one or more composite tape segments and one or more scrap portions; a secondary crack-off roller configured to engage one or more composite tape segments and one or more scrap portions; a pivot that connects the crack-off assembly to the tape lamination head, wherein the secondary crack-off roller selectively moves about the pivot to change a direction of composite tape movement; and a conveyor that receives the scrap portion(s) from the secondary crack-off roller.

In another implementation, a tape lamination head for applying a plurality of composite tape segments, include a frame that carries a supply reel of composite tape and a plurality of redirect rollers; a crack-off assembly comprising: a scrap crack-off redirect roller configured to engage one or more composite tape segments and one or more scrap portions; a secondary crack-off roller configured to engage one or more composite tape segments and one or more scrap portions; a pivot that connects the crack-off assembly to the tape lamination head, wherein the secondary crack-off roller selectively moves about the pivot to change a direction of composite tape movement; and a conveyor that receives the scrap portion(s) from the secondary crack-off roller.

DETAILED DESCRIPTION

A tape lamination machine includes a tape lamination head having a scrap collection assembly for removing scrap composite tape from backing paper and storing the scrap sections at the head. As discussed above, the creation of composite tape segments sometimes involves the creation of scrap segments of composite tape that is ultimately discarded. For example, the tail of a composite tape segment can be cut at a different angle than the head of a subsequent composite tape segment. A scrap portion of composite tape can be formed between or within sequential or composite tape segments cut in this way. In the past, the tape lamination head may have been moved away from a table base to a scrap removal location where the scrap section was removed from the backing paper by a machine operator. But this slows the rate at which composite tape segments can be applied thereby slowing the formation of a composite part. In contrast, the tape lamination head can collect scrap portions in situ with a scrap collection assembly the head carries. As composite tape passes through the tape lamination head and a cutting assembly cuts the tape to create one or more scrap portions, the scrap collection assembly can be activated to remove the scrap portion(s) from the backing paper and collect it in a collection tray. The scrap collection assembly can include a crack-off assembly, a conveyor, and a collection tray that will be discussed in more detail below.

After the cutting assembly cuts composite tape moving through the tape lamination head and creates a scrap portion, the scrap portion ultimately reaches a scrap position and a secondary crack-off roller can move into engagement with the backing paper affixed to the composite tape moving toward a compaction assembly. The engaged secondary roller can create a back bend in the composite tape path and direct the scrap portion toward the conveyor that draws the scrap portion away from the backing paper and communicates the scrap section into the collection tray. The scrap collection assembly can remove the scrap sections without assistance of an operator and without moving the tape lamination head to a scrap removal location.

Figure 1:
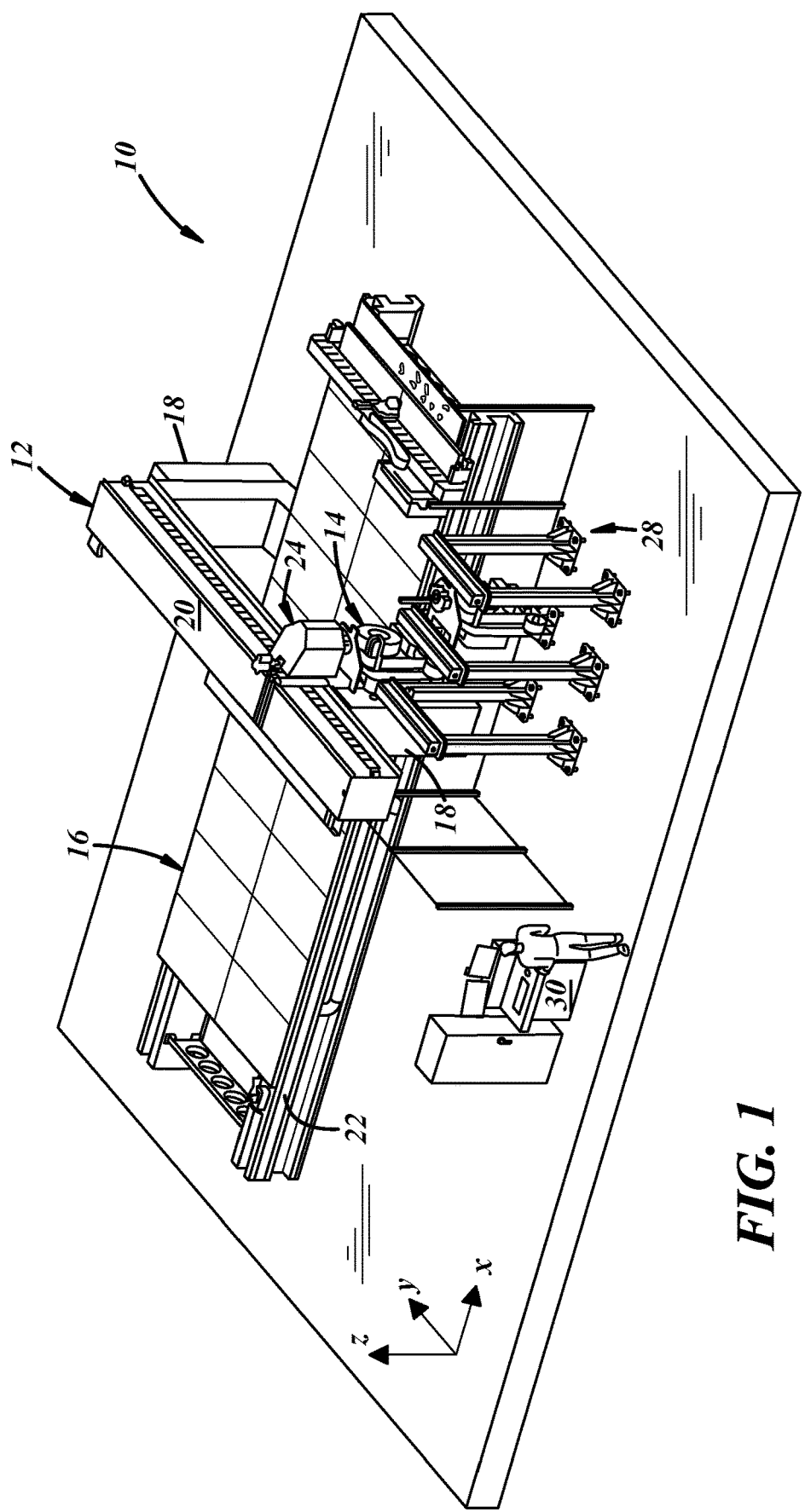
FIG. 1 is a perspective view depicting an implementation of a tape lamination machine.

An implementation of a tape lamination machine 10 is shown in FIG. 1. The tape lamination machine 10 includes a gantry 12 that movably carries a tape lamination head 14 over a table base 16 on which composite parts are formed from a plurality of composite tape segments. The gantry 12 can include vertical supports 18 that are linked via a horizontal support 20 or beam attached at an upper end of the vertical supports 18. The gantry 12 can be implemented as a multiple-axis tape lamination machine 10, such as a Cincinnati CHARGER ATL or GEMINI. In one implementation, the tape lamination machine 10 can permit six-axis movement of the tape lamination head 14. The bottom of the vertical supports 18 can move linearly along an X-axis relative to the table base 16. The bottom of the vertical supports 18 can move over rails 22 or wheels to move the gantry 12 along the X-axis. In one embodiment, the rails 22 can be included on the table base 16 such that the vertical supports 18 rest on the table. In other implementations, rails 22 can be formed on the floor where the tape lamination machine 10 is installed. A ram 24 can carry the tape lamination head 14 to raise and lower the head 14 relative to the table base 16 along the Z-axis. The tape lamination head 14 can be slidably connected to the horizontal support 20 at an end of the ram 24 distal to the tape lamination head. The slidable connector can permit the frame to move in the Y-axis direction over the table base 16. A releasable connector 26 between the tape lamination head 14 and the ram 24 can permit the removal and replacement of a tape lamination head. The vertical supports 18 and ram 24 can move along the X-, Y-, and Z-axes to position the tape lamination head 14 with respect to a replacement station 28. Afterwards, another tape lamination head 14 can be coupled to the ram 24 and moved by the gantry 12 into position over the table base 16.

Movement of the gantry 12, including the vertical supports 18 and the ram 24 can be controlled by an operator station 30. The operator station 30 includes one or more microprocessors (not shown) in communication with a computer readable storage medium having executable instructions can control movement of fluidic rams, electric motors, or other drive element thereby controlling the motion and position of the gantry 12 as well as the operation of the tape lamination head 14. The microprocessor(s) can be any type of device capable of processing electronic instructions including microcontrollers, host processors, controllers, and application specific integrated circuits (ASICs). It can be a dedicated processor used only to carry out control of the gantry 12 or can be shared with other machine functions. The microprocessor executes various types of digitally-stored instructions, such as software or firmware programs stored in memory. Communications between the mechanisms that move the gantry 12 and the tape lamination head 14, such as the fluidic rams or electric motors, and the microprocessor(s) can be carried out over a communications bus.

Figure 2:
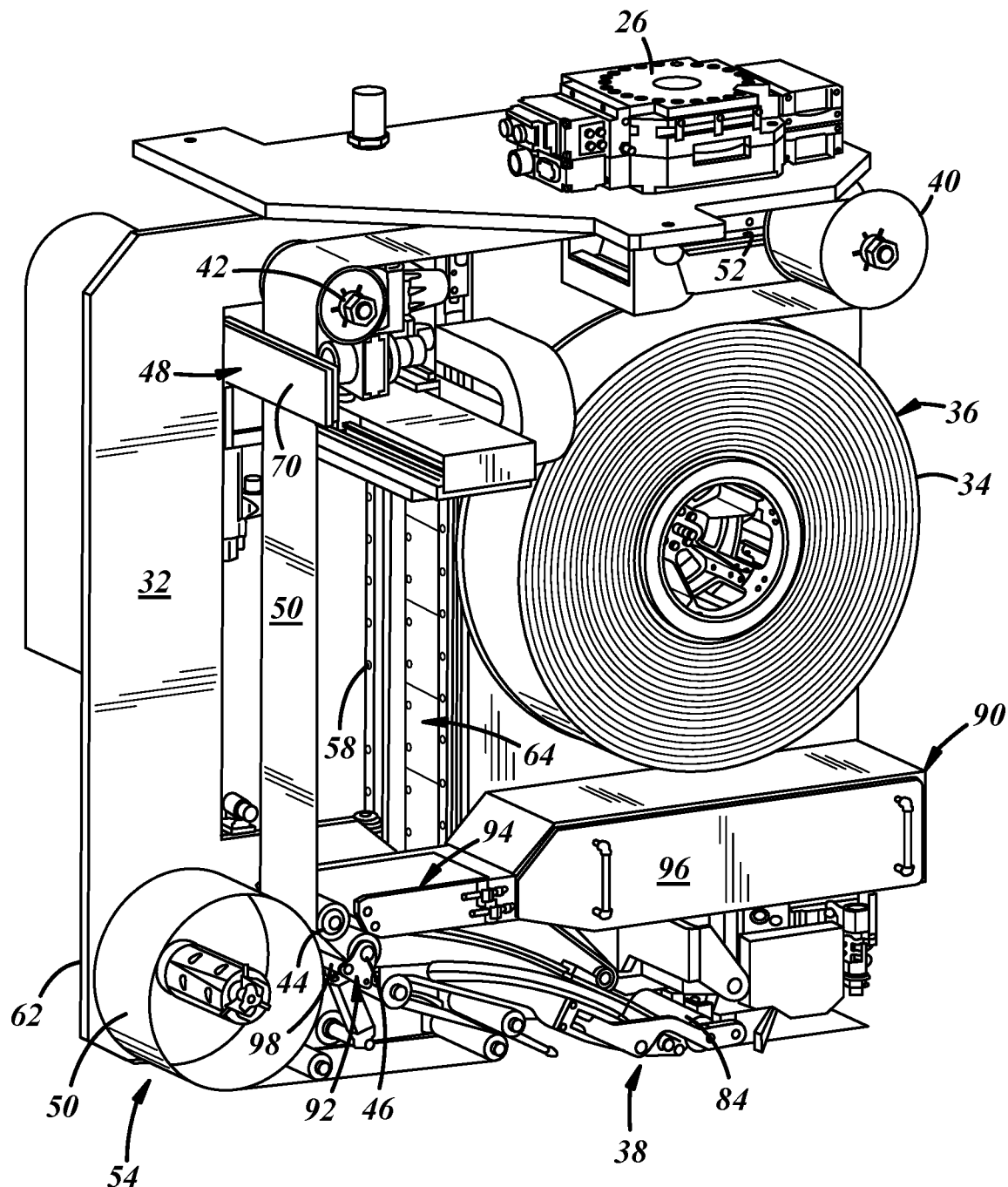
FIG. 2 is a perspective view depicting an implementation of a tape lamination head.
Figure 3:
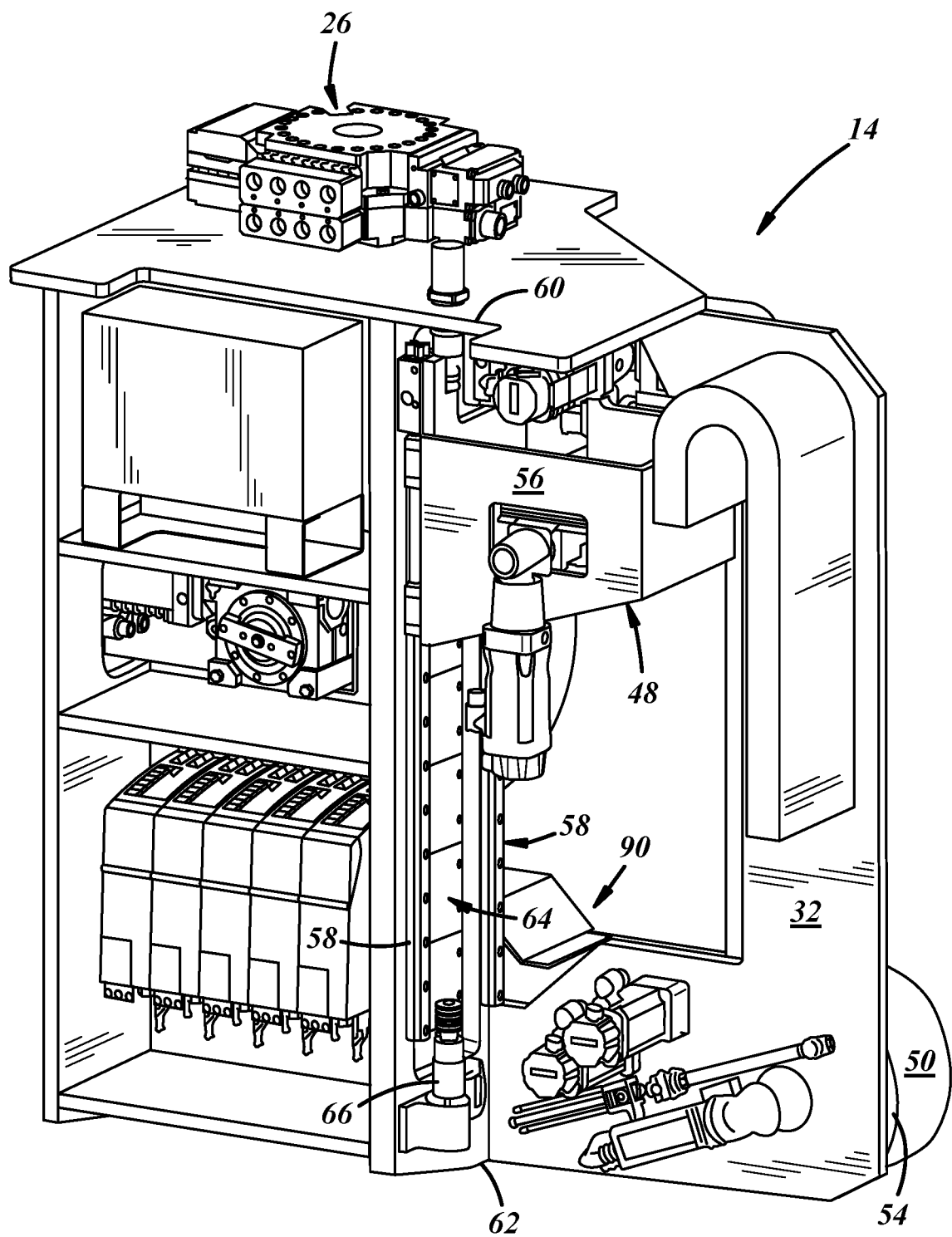
FIG. 3 is another perspective view depicting an implementation of a portion of a tape lamination head.

Turning to FIGS. 2 and 3, the tape lamination head 14 includes a frame 32 coupled to a releasable connector 26 that releasably attaches the head to the ram 24. The frame 32 can support a supply reel 34 carrying composite tape 36 that is ultimately supplied to a compaction assembly 38 applying the tape 36 to the table base 16. Along the way, the composite tape 36 can pass over a supply dancer 40, a first redirect roller 42, a second redirect roller 44, and a scrap crack-off redirect roller 46 that collectively route the tape 36 adjacent to a cutting assembly 48. Composite tape 36 can be wound around the supply reel 34 in one of a variety of widths. For example, composite tape 36 having a width of 1.5" to 12" can be wound around the supply reel 34 for later unwinding as the composite tape 36 is passed through the tape lamination head 14. The composition of composite tape 36 is known and can include carbon fiber as an example of composite tape. A backing paper 50 can be applied to one side of the composite tape 36 so that a surface of the composite tape 36 does not touch subsequently wound layers of tape 36. The supply dancer 40, the first redirect roller 42, and the second redirect roller 44 can be attached to dancer mechanisms 52 that control the tension exerted on the composite tape 36 pulled from the supply reel 34 and communicated to the compaction assembly 38. The dancing mechanisms 52 can permit linear movement of the rollers under control of a spring or a hydraulic ram. One or more electric motors can be used to apply rotational force to the supply reel 34, the supply dancer 40, the first redirect roller 42, or the second redirect roller 44. A backing paper reel 54 is included with the tape lamination head 14 and can accept backing paper 50 that has been removed from the composite tape 36 before the tape 36 is applied to the table base 16. In one implementation, servo motors are used that are powered by servo drives to control movement of the composite tape 36 along the supply reel 34, the supply dancer 40, or the backing paper reel 54.

The compaction assembly 38 applies composite tape section to the table base 16. The compaction assembly 38 can include a compaction roller 84 that presses the composite tape segment onto the table base 16 as well as a tail separation assembly. In some implementations, the compaction assembly 38 include a compaction slide.

The cutting assembly 48 is included with the tape lamination head 14 and moves along a linear path in a direction of composite tape movement via a cutter carriage 56. The linear path can be a rail 58 or slot over which the cutting assembly 48 moves linearly, adjacent to the path of composite tape moving toward the compaction assembly 38. In this implementation, the cutting assembly 48 moves vertically from a top portion 60 of the tape lamination head 14 to a bottom portion 62 of the head 14. A linear motor 64 can move the cutting assembly 48 along the rail 58 in the same direction or plane in which the composite tape 36 moves toward the compaction assembly 38. As the cutting assembly 48 approaches an end of its movement, a crash stop 66 can help stop the downward movement of the assembly 48.

The cutting assembly 48 can include a cutting blade 68 that cuts sections of composite tape 36 against a cutting anvil 70 as the tape 36 travels toward the compaction assembly 38. Rather than stopping the movement of composite tape 36 through the tape lamination head 14, the cutting assembly 48 can be moved in coordination with the tape 36 so that the cutting blade 68 is traveling at the same velocity as the tape 36. In that way, the only relative motion between the composite tape 36 and the cutting blade 68 occurs when the blade 68 is moved to cut the tape 36.

Figure 4:
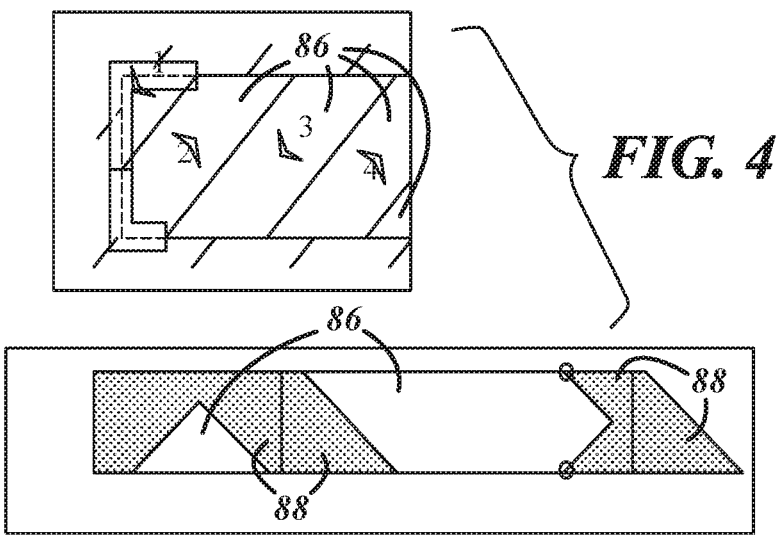
FIG. 4 is a plan view depicting an implementation of a pattern of applied composite tape sections and a composite tape section along with scrap on backing paper.

The composite tape 36 can be cut into a variety of shapes as is shown in FIG. 4. The section of composite tape is shown with a composite tape segment 86 that will be applied to the table base 16 and scrap portions 88. The composite tape segments 86 are shown included with the scrap portions 88 after cutting but before removal of both from the backing paper 50. A pattern showing the composite tape segments 86 applied to the table base 16 is shown as well. After cutting the composite tape 36 into a composite tape segment 86 and a scrap portion 88, the composite tape 36, including both the composite tape segment 86 and the scrap portion 88 attached to the backing paper 50, moves toward a scrap collection assembly 90.

The scrap collection assembly 90, shown in FIGS. 5(*a*) and 5(*b*), can include a crack-off assembly 92, a conveyor 94, and a collection tray 96 that collectively work together to remove the scrap portion 88 from the backing paper 50 before passing the composite tape segment 86 to the compaction assembly 38 that applies the composite tape segment 86 to the table base 16. The composite tape segment 86 and scrap portion 88 follow a tape path that includes a second redirect roller 44 and a scrap crack-off redirect roller 46. The second redirect roller 46 can be a passive roller fixedly mounted on the frame and serving to change the direction of the tape path as the composite tape travels toward the compaction assembly. The scrap crack-off redirect roller 46 can also passively change the direction of the tape path as the composite tape 36 travels toward the compaction assembly 38. However, the scrap crack-off redirect roller 44 can be included with the crack-off assembly 38 along with a secondary crack-off roller 98 that can selectively change the direction of composite tape travel or the shape of the tape path while positioned in a scrap collecting mode. The crack-off assembly 92 includes the scrap crack-off redirect roller 46, the secondary crack-off roller 98, a pivot 100, and a piston 102 or similar mechanical or electromechanical actuator that selectively moves the crack-off assembly 92 between a tape laying mode and a scrap collecting mode. In some implementations, the scrap crack-off redirect roller 46 can rotate or spin about an axis of pivot rotation for pivot 100. The crack-off assembly 92 can comprise a roller frame 104 that carries the scrap crack-off redirect roller 46 and the secondary crack-off roller 98. The pivot 100 can rotatably link the crack-off assembly 92 to the frame 32 of the tape lamination head 14. The piston 102, such as a fluidic ram or a linear motor, can extend or retract thereby moving the crack-off assembly 92 about the pivot 100. In other implementations, a different mechanical actuator could be used. The secondary crack-off roller 98 is positioned opposite the scrap crack-off redirect roller 46 such that the secondary crack-off roller 98 can contact the backing paper 50 and the scrap crack-off redirect roller 46 can contact the composite tape 36.

Figure 5A:
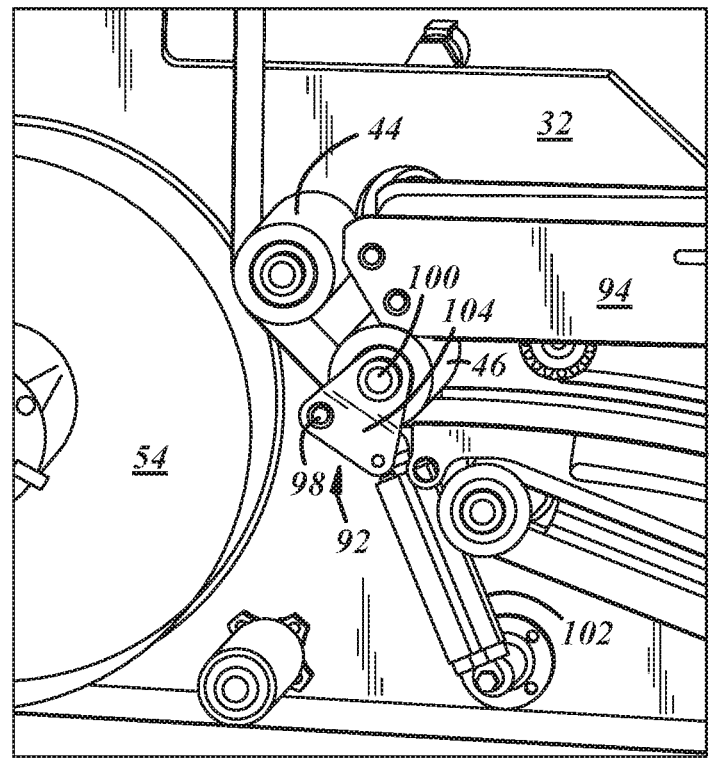
FIG. 5(a) is a perspective view depicting an implementation of a portion of a scrap collection assembly in a tape laying mode or position.
Figure 5B:
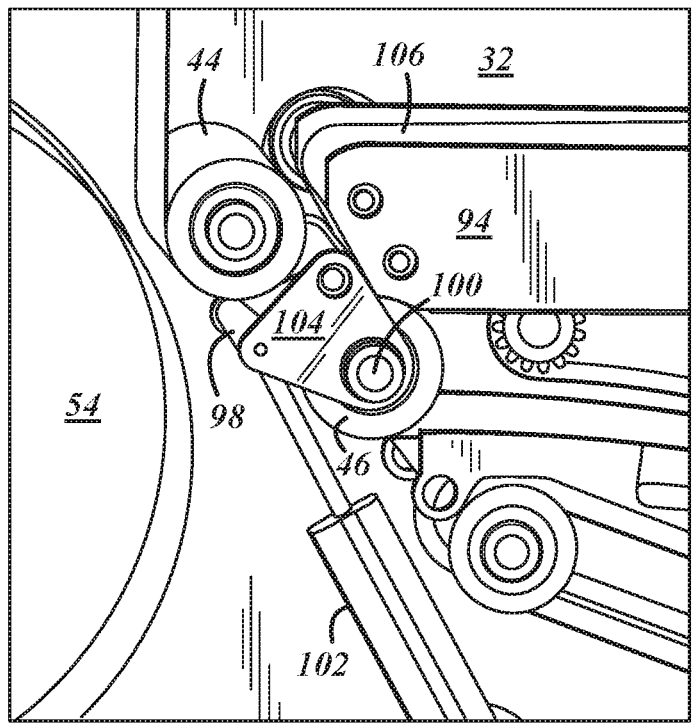
FIG. 5(b) is a perspective view depicting an implementation of a portion of a scrap collection assembly in a scrap collecting mode or position.
Figure 6:
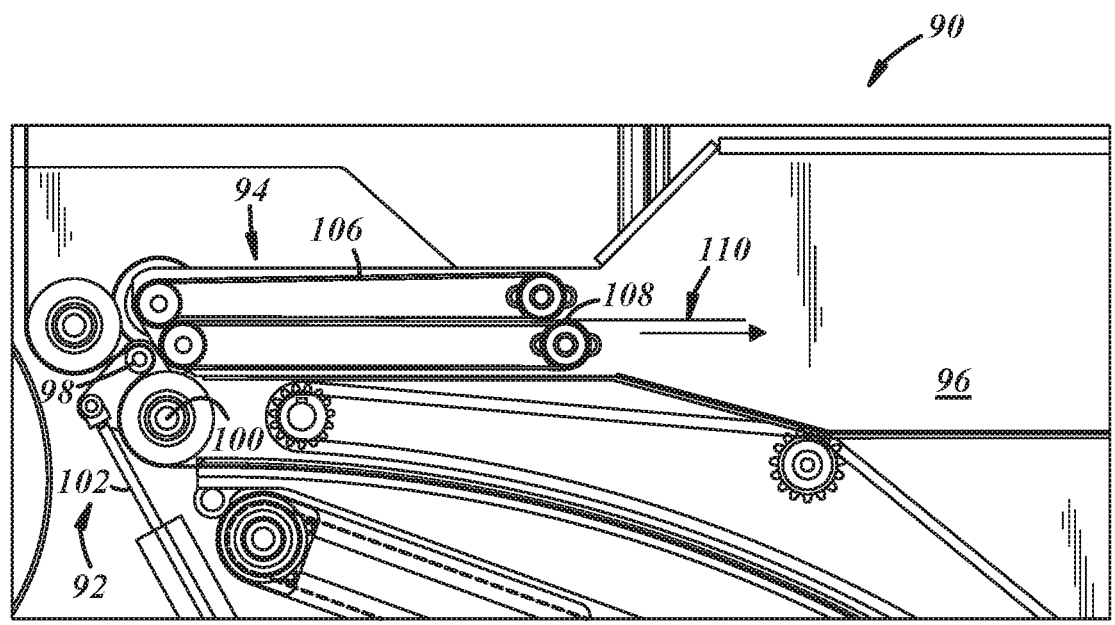
FIG. 6 is a profile view depicting an implementation of a portion of a scrap collection assembly.

In a tape laying mode, the crack-off assembly 92 can be positioned so that the tape path is influenced by the second redirect roller 44 and the scrap crack-off redirect roller 46 as the composite tape 36 passes to the compaction assembly 38. The position of the crack-off assembly 92 in tape laying mode or position is shown in FIG. 5*a*. When a composite tape segment 86 is cut and a scrap portion 88 is created as part of the cut, the crack-off assembly 92 can be moved into a scrap-collection mode or position where the crack-off assembly 92 changes the tape path or direction of composite tape 36 toward the conveyor 94 that transfers the scrap portion 88 to the collection tray 96. The position of the crack-off assembly 92 in scrap-collection mode is shown in FIG. 5*b*. In this embodiment, the crack-off assembly 92 rotates about the pivot 100 so that the secondary crack-off roller 98 engages the backing paper 50 of the composite tape 36 and changes the tape path or direction so that the scrap portion 88 can be received by the conveyor 94. Once the scrap portion 88 is received by the conveyor 94 the crack-off assembly 92 moves back to the tape laying mode position and the composite tape segment 86 can travel to the compaction assembly 38.

Figure 7:
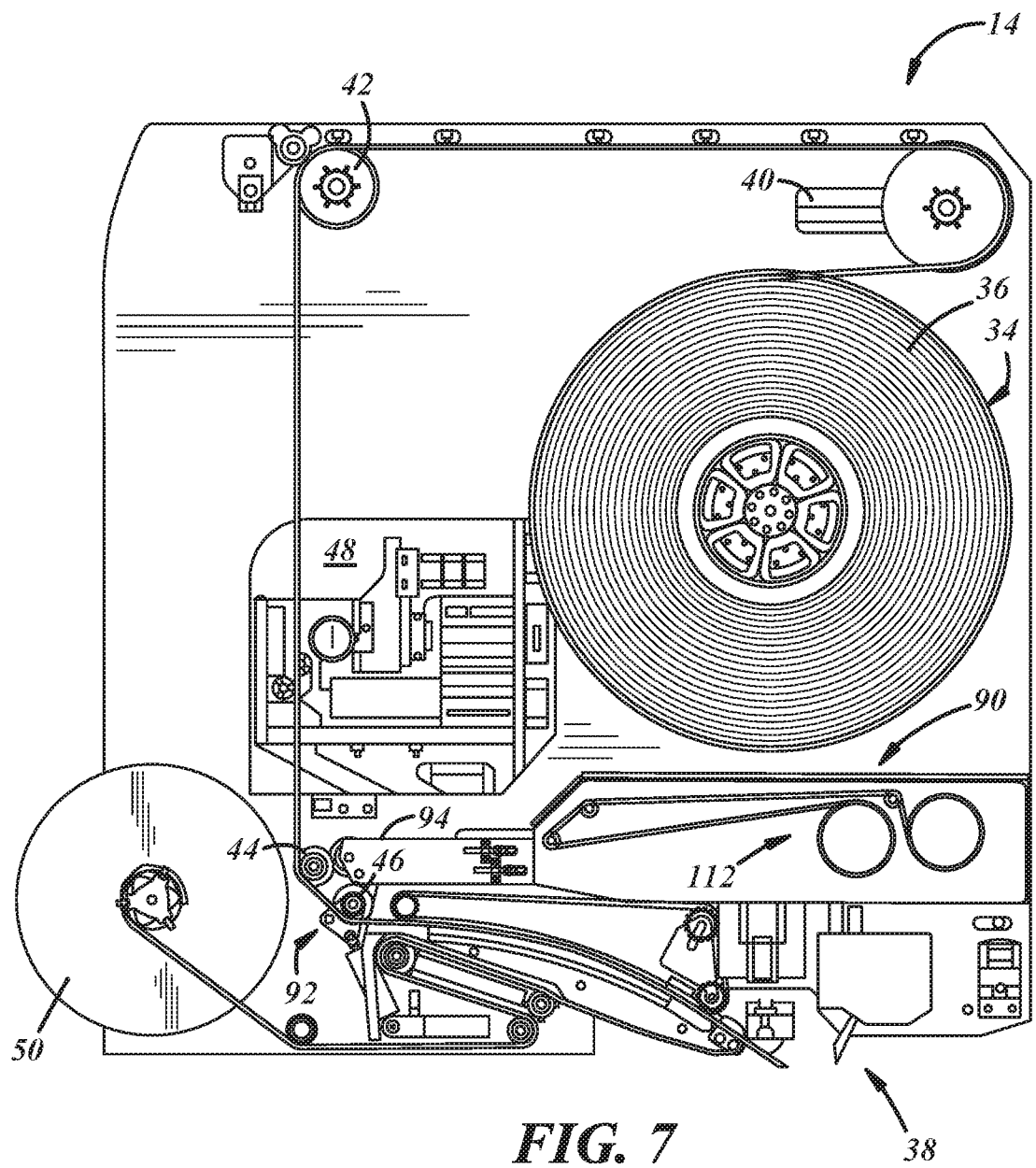
FIG. 7 is a profile view depicting another implementation of a tape lamination head.

A conveyor 94 can receive scrap portions 88 and transfer them to the collection tray 96. The conveyor 94 can include two opposed belts 106, 108 that counter rotate to pull the scrap portion 88 from the backing paper 50 and transfer it to the collection tray 96. One end of the belts 106, 108 is positioned adjacent to the second redirect roller 44 such that scrap portions 88 pass in between the second redirect roller 44 and the scrap crack-off redirect roller 46. A first belt 106 can rotate in a counter-clockwise direction and a second belt 108 can rotate in a clockwise direction while the first belt 106 and the second belt 108 engage each other. The collective motion of the first belt 106 and the second belt 108 can move scrap portions 88 from the second redirect roller 44 along a scrap path 110 to another end of the belts 106, 108 where the collection tray 96 receives the scrap portion 88. The first belt 106 and second belt 108 can be made of a rubberlike material that is flexible but also has a sufficient coefficient of friction that pulls the scrap portion 88 off the backing paper 50 and holds the scrap portion 88 between the belts 106, 108 as the portion is transferred to the collection tray 96. The collection tray 96 can be a container that is sized to accept a particular length and quantity of scrap portions 88. The collection tray 96 can also be removable from the tape lamination head 14 so that scrap portions 88 can be disposed of. In another implementation, the collection tray 96 can be replaced with a scrap spool 112 that receives scrap portions 88 from the conveyor 94 and winds the portions around the scrap spool 112 as is shown in FIG. 7. The scrap spool 112 can be configured to handle longer lengths of scrap portions 88 as they exit the conveyor 94. The scrap portions 88 can roll up on the scrap spool 112 on a scrap roll up medium such as shipping tape.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A tape lamination head for applying a plurality of composite tape segments, comprising:
   a frame that carries a supply reel of composite tape and a plurality of redirect rollers;
   a crack-off assembly comprising:
     a scrap crack-off redirect roller configured to engage one or more composite tape segments and one or more scrap portions;
     a secondary crack-off roller configured to engage one or more composite tape segments and one or more scrap portions;

a pivot that connects the crack-off assembly to the tape lamination head, wherein the secondary crack-off roller selectively moves about the pivot to change a direction of composite tape movement; and a conveyor that receives the one or more scrap portions from the secondary crack-off roller.

2. The tape lamination head recited in claim 1, further comprising a collection tray that is configured to receive the one or more scrap portions from the conveyor.

3. The tape lamination head recited in claim 2, wherein the collection tray is configured to be removable from a scrap collection assembly.

4. The tape lamination head recited in claim 1, further comprising a scrap spool that receives the one or more scrap portions from the conveyor.

5. The tape lamination head recited in claim 1, further comprising a piston attached to the frame of the tape lamination head and a scrap collection assembly that rotates the crack-off assembly about the pivot.

6. The tape lamination head recited in claim 1, wherein the scrap crack-off redirect roller rotates about an axis of pivot rotation of the pivot.

\* \* \* \* \*